April 18, 1950 M. N. FAIRBANK 2,504,312
COMBINED CONTROL MEANS FOR ADJUSTING APERTURE
SIZE AND SHUTTER SPEED OF CAMERAS
Original Filed Feb. 7, 1947 3 Sheets-Sheet 1

INVENTOR
Murry N. Fairbank
BY
Donald L. Brown
Attorney

April 18, 1950   M. N. FAIRBANK   2,504,312
COMBINED CONTROL MEANS FOR ADJUSTING APERTURE
SIZE AND SHUTTER SPEED OF CAMERAS
Original Filed Feb. 7, 1947   3 Sheets-Sheet 2

INVENTOR
Murry N. Fairbank
BY
Donald L. Brown
Attorney

Patented Apr. 18, 1950

2,504,312

UNITED STATES PATENT OFFICE 2,504,312

COMBINED CONTROL MEANS FOR ADJUSTING APERTURE SIZE AND SHUTTER SPEED OF CAMERAS

Murry N. Fairbank, Belmont, Mass., assignor to Polaroid Corporation, Cambridge, Mass., a corporation of Delaware Original application February 7, 1947, Serial No. 727,002. Divided and this application January 25, 1949, Serial No. 72,665

11 Claims. (Cl. 95—64)

This invention relates to photographic apparatus and more particularly to novel shutter and diaphragm mechanism and indicating means therefor, for association with the exposure aperture of a camera.

This application is a division of application Serial No. 727,002, filed February 7, 1947, by Murry N. Fairbank and Sidney B. Whittier for "Camera shutter mechanism."

An object of the invention is to provide camera shutter and diaphragm elements having associated therewith novel mechanism and indicating means providing an operational setting of said elements to a given exposure value, said operational setting comprising shutter speed and diaphragm aperture settings selectable from a plurality of available settings thereof whereby a correct photographic exposure may be obtained.

A further object of the invention is to provide camera shutter and diaphragm elements having associated therewith novel mechanism, indicating means, and control means for setting up a given exposure value from a plurality of selectable exposure values, the aforesaid mechanism, indicating means, and control means coacting to assure maximum possible shutter speed at any aperture setting.

Still another object of the invention is to provide simple indicating and control means connecting with mechanism for setting up camera shutter speeds and aperture diameters suitable for employment with one another for obtaining correct photographic exposures, the indicating means comprising a rotatable dial element having placed thereupon a plurality of numbers in progressive order representing a plurality of pre-established light values, and a fixed index element, said dial being rotatable through a single control knob, enabling said dial numbers to be brought adjacent said index, thereby setting up a shutter speed and an aperture diameter suitable for providing a given exposure.

A still further object of the invention is to provide means for varying shutter speed and size of diaphragm apertures, said means being combined in a single rotatable element.

Yet another object of the invention is to provide a fixed index and a single rotatable element for varying both shutter speed and size of diaphragm apertures, said rotatable element also carrying light value indicia selectively positionable relative to said fixed index.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Shutter mechanism of the general form comprehended by the invention is relatively simple in construction and possesses accurate "time-keeping" properties, due in large measure to novel constructions providing a minimum of surfaces in frictional contact with one another during movement of the shutter. A shutter of the aforesaid characteristics permits accurate calibration of its various speed settings and will be seen to have advantages wherein a large measure of control of the finished print may depend upon exposure values. Shutter speed, as referred to herein, is to be regarded in terms of an exposure period during which light passes through the lens aperture. The exposure period is determined by the size of the arc through which the shutter rotates before reversal of its movement takes place and to controlled speed of movement thereof, to and from a point of reversal. The shutter is adapted to incorporation with any of a variety of conventional cameras but is particularly suitable as a between-the-lens shutter in cameras employing lenses of small relative aperture which are adapted to exposure of film having a "fast" emulsion. A rotatable disc-type diaphragm having a plurality of apertures of predetermined diameter may preferably be employed in conjunction with the shutter, said type of diaphragm permitting formation therein of small apertures of exact light admitting properties and, as exemplified by the invention, being particularly suitable for actuating shutter speed setting elements directly or through interlocking mechanism. An iris type diaphragm may, however, be employed satisfactorily with the aforesaid shutter. Indicating means shown, while particularly adapted to association with the novel shutter and diaphragm of the invention, may be used in conjunction with other types of shutters and diaphragms through provision of suitable interconnecting mechanism.

Figure 1:
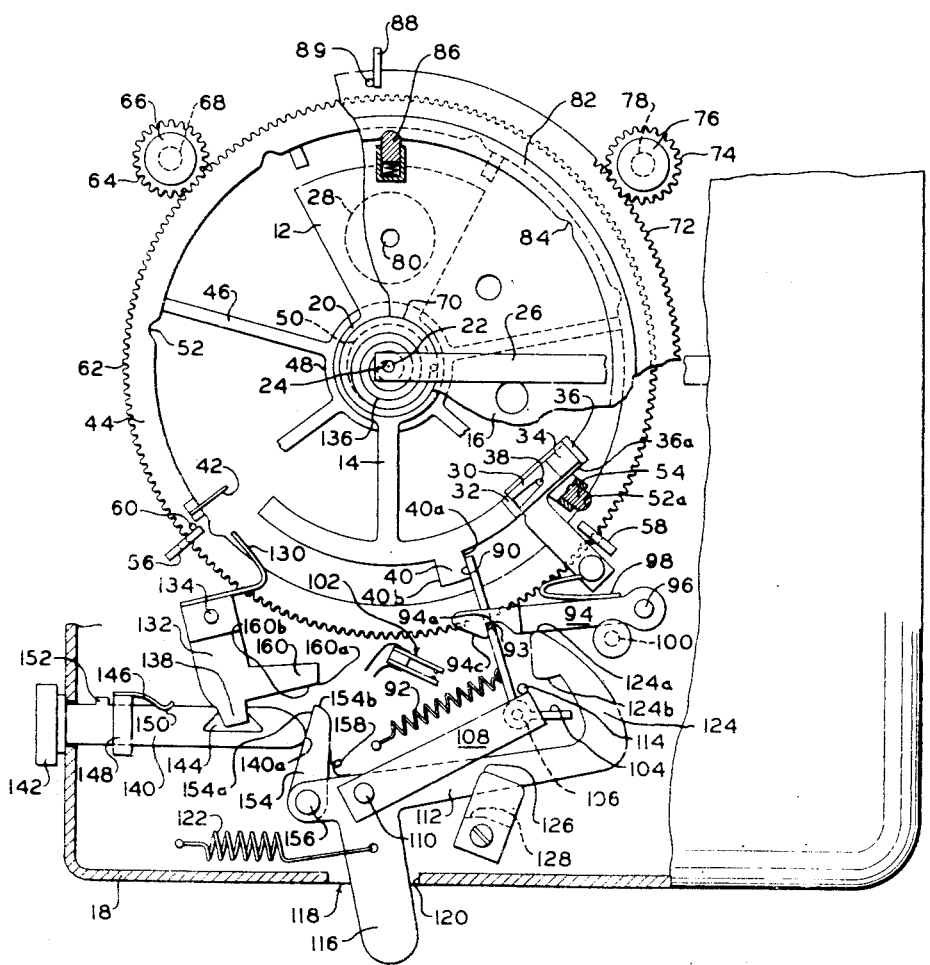
Figure 1 is a somewhat schematic elevational view, partly in cross section and with parts broken away, of one form of the novel apparatus of the invention.

Referring to Fig. 1, the rotatable shutter blade 12, shutter blade counterbalance 14, fragmentary portion of the disc-type diaphragm 16, and other associated elements are represented as they would appear from a position in front of a camera, casing portions, excepting a small section 18 thereof, having been broken away for the purpose of exposing the aforesaid elements. For convenience of terminology, the shutter blade 12, counterbalance 14, hub 20, and bearing shaft or axle 22 may occasionally be referred to herein as the "shutter," all of the aforementioned elements being shown as rigidly attached to one another and thus rotatable as a unit. Directions of rotation of the shutter and other associated elements, and position of elements, as hereinafter described, are those which would be observed when said elements are viewed from the above-described position, the descriptive language being in accordance with said point of observation.

Shaft 22 is journaled at each extremity into bearing means 24 which may be formed in a pair of rigid supporting members, one of said members 26 being shown. Each of said supporting members between which the shutter is positioned, and upon which it is rotatably mounted by said bearing means, may alternatively be provided in the form of a web, or a portion of the camera casing per se. The shutter is shown in closed position, namely, shutter blade 12 is positioned to obstruct the passage of light through lens aperture 28. The aforesaid closed position of the shutter is determined by a limit stop comprising a magnet 30, against which a block of suitable magnetic material 32, comprising an extremity of counterbalance 14, is brought to rest. Said magnet, preferably of a horseshoe type, as shown, is bonded to a block composed of suitable resilient material 34, such as rubber or a material comprising polyvinyl butyral, said block 34, in turn, being bonded to forwardly extending portion 36 of an angular plate comprising also a lateral portion 36a with which said magnet is in slidable contact. A pin 38, preferably of nonmagnetic material, extends forwardly from plate 36, said pin being interposed between the poles of magnet 30 and having a diameter less than the distance between said poles. The aforesaid constructions provide a limit stop which yields under impact of magnetic block 32. The magnet 30 of said limit stop coacting with magnetic block 32 comprises means for preventing rebound of the shutter away from the stop once contact of said block 32 and magnet 30 has been established, magnetic force exerted upon said block by magnet 30 being adapted to the purpose. It will be seen that said elements also hold the shutter at closed position when idle. Movement of slidable magnet 30 toward block 32 is limited by pin 38.

Projecting lug 40 of the counterbalance constitutes a portion of the shutter suitable for receiving an impulse for rotating said shutter in a clockwise direction, more specifically, the righthand surface 40a of said lug being adapted thereto. In addition to providing means against which a force for rotation may be applied, lug 40 serves as contributory means for determining direction and extent of rotation of the shutter in the following manner. The extent of clockwise rotation of the shutter, when actuated for said movement by means more fully to be described, is limited by contact of lug 40 with a spring 42, which may be termed a "rebound" spring, mounted so as to intercept surface 40b of lug 40 during arcual movement of the latter. Reversing means 42 may be constructed of any suitably resilient material properly formed for the purpose, said means preferably comprising a spring-like member composed of steel, phosphor bronze or the like. The spring may be flat in form, as shown, or of any other suitable shape and thickness for predeterminedly limiting clockwise rotation of the shutter and for causing rotational reversal of said shutter in a counterclockwise direction. Thus, it will be seen that the measure of clockwise rotational movement of the shutter, from the closed position shown in Fig. 1, is determined by the arcual distance initially separating lug 40 and spring 42, by the mass and velocity of the rotating shutter, and by the deflection characteristics of spring 42 under load caused by impingement of lug 40 thereupon. Further, it will be apparent that the speed of rotation of the shutter through a single exposure cycle, comprising successive clockwise and counterclockwise rotation, is substantially predetermined by such factors as the magnitude and characteristics of delivery of the force applied to lug 40 for initiating its clockwise rotation, by the mass of the shutter by the deflective characteristics of spring 42 and by the amount of friction existing between bearing members 22 and 24.

As shown in Fig. 1, rebound spring 42 may, for example, be mounted upon an annular spring carrier member 44, said carrier member being integral with or suitably connected, as by members 46, to a hub 48, and said hub being rotatably mounted upon a fixed axle 50. Axle 50 may preferably be in the form of an annular member rigidly attached to or integral with the further supporting members 26, axle 50 and shaft 22 being concentric, and shaft 22 turning freely within said fixed axle 50. It will be apparent from Fig. 1 that clockwise rotation of spring carrier member 44 for the purpose of altering the position of rebound spring 42 increases the arcual distance which lug 40 must travel to and from contact with said rebound spring and hence decreases the shutter speed. Upon suitable portions of its surface, such as the inner surface shown, spring carrier 44 is provided with predeterminedly spaced recesses 52 adapted to releasable engagement with any suitable detent means, such as detent means 54, whereby rebound spring 42 may be rotated to, and operationally held at, any of a plurality of pre-established positions. In Fig. 1, the position of elements shown represents a setting of rebound spring 42 for maximum shutter speed, namely, a setting at which lug 40 will travel a minimum arcual distance to said rebound spring and during which shutter blade 12 will barely uncover aperture 28 prior to being reversed in its direction of rotation. At said position of elements it will be noted that detent 54 engages recess 52a, thus insuring a positive setting of said elements. Limit stops 56 and 58, fixedly mounted upon casing portions (not shown), are suitably positioned for intercepting a pin 60 extending from spring carrier member 44 and for defining maximum counterclockwise and clockwise rotation, respectively, of said member 44, said limits of rotation being those at which maximum and minimum shutter speed, respectively, occur.

Means suitable for manually rotating rebound spring carrier member 44, and thereby varying shutter speed, as above described, are provided, respectively, by a toothed construction of peripheral portions of said member 44 forming a gear 62, by a pinion 64 engaging said gear 62, and by a control knob 66, rigidly attached to said pinion 64, through a shaft 68, said shaft being of a length sufficient to extend through the camera casing and permit manual rotation of said knob exteriorly of said casing.

As previously stated, any conventional diaphragm may be operationally associated with the shutter of the invention, a disc-type diaphragm being particularly suitable where simplicity of construction and small relative apertures are to be employed. The disc-type diaphragm 16, shown in fragmentary form in Fig. 1, is mounted for rotation about a fixed axle 70, said axle being, for example, in the form of an annular member rigidly attached to or integral with supporting member 26, and concentric with shaft 22, it being assumed that the diaphragm comprises suitable hub portions (not shown) for mounting upon axle 70. Means suitable for rotating the diaphragm and for centering any of the apertures thereof adjacent lens aperture 28 are provided, said means, for example, comprising a toothed construction of peripheral portions of diaphragm 16 forming a gear 72, a pinion 74 engaging said gear 72, and a control knob 76 rigidly attached to said pinion 74 by a shaft 78 of sufficient length to pass through the camera casing. The smallest of available diaphragm apertures 80 is shown positioned contiguous lens aperture 28. Means for releasably holding any of the apertures of diaphragm 16 at exposure position comprise an annular flange portion 82 of said diaphragm having a plurality of predeterminedly spaced recesses 84 formed therein, said recesses being adapted to releasable engagement with suitable detent means 86. Suitable stop limits may be provided for defining limits of rotation of diaphragm 16, stop limit 88, mounted on casing or frame portions of the camera (not shown), and pin 89, extending from said diaphragm, being shown in contact therewith and representing a setting of extreme counterclockwise rotation of the diaphragm. Although not shown, it will be understood that suitable indicating means may be incorporated with the aforesaid mechanism whereby correlated settings of shutter speed and apertures are made in accordance with prevailing light values.

Self-cocking mechanism for actuating rotation of the shutter is shown in elevation in Fig. 1, the position of elements representing substantially that which would prevail at the instant when the shutter is about to commence a given exposure cycle. The element of said mechanism which contacts the shutter directly is shown as a pivotally mounted arm 90 which may be termed the "impulse arm," said arm being biased for counterclockwise rotation by an extension spring 92 attached, respectively, to said arm and to camera frame portions. An extremity of impulse arm 90 is held in contact with lug 40 of the shutter, at cocked position of the shutter actuating mechanism, and is adapted to transmit driving force to said lug for a brief period upon release of said shutter actuating mechanism. Upon reception of driving force from arm 90, the shutter commences to rotate through an exposure cycle. It will be seen in the aforesaid relation of elements that counterclockwise rotation of impulse arm 90 causes clockwise rotation of the shutter, rotational force being continuously transmitted by said impulse arm to shutter lug 40 until divergence in the arcual movement of said shutter and impulse arm, due to separate pivotal mountings thereof, breaks their contact with one another. Under impetus initially supplied by said impulse arm 90, the shutter continues to rotate in a clockwise direction until it impinges rebound spring 42 and its direction of rotation is reversed thereby, as previously described. A shoulder 93 or other suitably formed portion of arm 90 is provided for engagement with a latch 94, said latch having a notched portion 94a for the purpose, and said latch being rotatably mounted upon a portion of the camera frame (not shown) by a pivot 96 and biased toward said shoulder by a spring 98. Counterclockwise rotation of latch 94 is limited by limit stop 100 mounted upon aforesaid camera frame. Impulse arm 90, after terminating its contact with lug 40, continues to rotate in a counterclockwise direction under bias applied by spring 98 until meeting limit stop 102. As shown, liimt stop 102 is in the form of a pair of spring-like elements, comprising a pair of electrical contacts, said elements providing effective cushioning means for terminating pivotal movement of impulse arm 90 and for completing a circuit to a photoflash lamp (not shown). It will be understood that element 102 may serve as a limit stop only, where no connection to a photoflash lamp is provided.

It will be noted that impulse arm 90 constitutes one arm of a bell-crank which comprises a second arm 104 extending angularly relative to arm 90, said arm 104 being adapted, during cocking of the mechanism, to receive a rotational force, which will presently be described, causing its pivotal movement in a clockwise direction and thus returning impulse arm 90 to a cocked position. The bell-crank, comprising arms 90 and 104, is rotatably connected by pivot 106 to an arm 108, said last-named arm, in turn, being rotatably connected by pivotal stud 110 to trigger 112. Stud 110 is of sufficient length to provide a clearance between arm 108 and trigger 112 for unobstructed movement therebetween of the bell-crank comprising arms 90 and 104. It should be noted that arm 108, during the cocked position of impulse arm 90, shown, is at an angle of counterclockwise rotation which brings it adjacent limit stop 114 comprising a pin mounted upon a portion of the camera frame, extension spring 92 operating to bias arm 108 toward said stop in addition to its function of actuating impulse arm 90 as hereinbefore described. Trigger 112, in turn, is rotatably mounted upon a frame portion by an inwardly extending portion of the aforesaid pivot 110, it being understood that independent rotation is permitted elements 108 and 112. Trigger 112 comprises a handle portion 116 extending through slot 118 in casing 18, said portion being adapted to manual movement for rotating the trigger handle in a counterclockwise direction to limit stop 120, said stop, as shown, being formed by a portion of casing 18. Upon release of handle 116, clockwise rotation of trigger 112, comprising said handle, is actuated through bias applied thereto by extension spring 122, connected, respectively, to said handle 116 and a frame or casing portion of the camera.

Trigger 112 also comprises an angular arm portion 124 suitably formed for both tripping and cocking the aforesaid mechanism for actuating rotation of the shutter. When trigger handle 116 is manually rotated in a counterclockwise direction, arm 124 is caused to rotate similarly and surface 124a of said arm is actuated to move substantially upwardly to contact latch 94, and to withdraw said latch from shoulder 93 of impulse arm 90, thus releasing the impulse arm and enabling the latter to drive the shutter. In Fig. 1 trigger portion 124a is shown actuating latch 94 in the above-described manner. It will be apparent that when impulse arm 90 is rotated in a counterclockwise direction to its limit stop 102, arm 104, integral therewith, is rotated in a similar direction to a position generally adjacent surface 124b of arm 124. Upon removal of manual force from trigger handle 116, extension spring 122 assumes control of the mechanism, trigger 112, comprising handle 116 and arm portion 124, being caused to rotate in a clockwise direction. Latch 94 rotates to its limit stop 100, and surface 124b is brought to bear upon arm 104. The rotational force applied by said surface 124b to arm 104 accomplishes two functions relative to cocking the mechanism, said functions being performed substantially concurrently, as follows. Assuming tension of spring 122 to exceed that of spring 92, as indicated in the drawing, arm 108 is caused to rotate in a clockwise direction about pivotal stud 110, impulse arm 90, accordingly, being rotationally carried in a generally downward direction to a position enabling its extremity to pass freely beneath shutter lug 40 during return rotation of the impulse arm to cocked position. During the aforesaid rotation of the impulse arm to cocked position, shoulder 93 moves along angular surface 94c of latch 94, thereby rotationally lifting the latch slightly against the bias of latch spring 98, said shoulder finally entering notch 94a of said latch. Clockwise rotation of arm 108 and trigger 112, upon completion of aforesaid operations, is limited by stops 126 and 128, respectively.

Mechanism adapted to manual setting for a "bulb exposure" and having associated therewith means providing automatic return of said mechanism to an instantaneous exposure setting, after completion of the "bulb exposure" is shown in Fig. 1, said associated means comprising interlocking connection with the trigger, for achieving said automatic return. The aforesaid mechanism and associated means comprise latching arm 130 mounted upon a bell-crank 132, said bell-crank, in turn, being rotatably mounted upon frame portions of the camera by a pivot 134. When arm 130 is pivoted to maximum clockwise or "bulb exposure" position, extreme portions thereof are brushed aside by lug 40 during clockwise rotation of the latter. After lug 40 has passed latching arm 130, said arm springs inwardly, lug surface 40b strikes rebound spring 42, the latter reverses the direction of shutter rotation, and the tip of latching arm 130 intercepts surface 40a of said lug, terminating further rotation of the shutter and holding the shutter at open position. It will be understood that deflection characteristics of latching arm 130 are such as to permit no appreciable diminution in speed of clockwise rotation of the shutter, thus insuring accurate time exposures. The shutter is biased against latching arm 130 by torsional hairspring 136 connected respectively to rotatable shutter shaft 22 and supporting member 26. The hairspring has substantially no effect upon overall shutter speed during a given rotational cycle of the shutter inasmuch as said hairspring, while retarding shutter rotation in a clockwise direction, accelerates rotation of the shutter in a counterclockwise direction, one force substantially canceling the other during the complete shutter cycle. Means for rotating shutter latching arm 130 in a clockwise direction comprises a lever-like stud 138 extending angularly from modified bell-crank 132 and a horizontally movable arm 140 extending through casing 18, said arm having a control knob 142 attached thereto at an extremity exterior of said casing and having a slot 144 formed therein for receiving said stud 138. It will be apparent that manual actuation of arm 140 causes pivotal movement of bell-crank 132 and latching arm 130 extending therefrom. In Fig. 1, arm 140 is shown at its maximum inward position, namely, at a position for instantaneous exposure, as determined by contact of knob 142 with casing 18, said arm 140 having rotated shutter latching arm 130 in a counterclockwise direction outside of the arcual path of lug 40. Suitable detent means are provided for releasably holding the aforesaid elements in positions shown, said means comprising a spring member 146 mounted on guide 148 and adapted to engage a recess 150 formed in arm 140, guide 148 being mounted upon frame portions of the camera. A dog 152 extending perpendicularly from arm 140 is provided for contacting casing 18 during withdrawal of said arm through said casing, thereby fixing the limit of said withdrawal and, accordingly, establishing the limit of clockwise rotation of shutter latching arm 130 which provides a "bulb exposure" setting.

Interlocking mechanism for automatically returning arm 140 inwardly and thereby rotating shutter latching arm 130 in a counterclockwise direction for releasing lug 40, after a "bulb exposure," comprises an arm 154 rotatably mounted upon an extremity of trigger 112 by pivot 156, a spring 158 biasing arm 154 in a counterclockwise direction, extremity 140a of arm 140, suitably formed for slidable contact of arm 154 therewith, and arm 160 of modified bell-crank 132. With arm 140 at the maximum inward or instantaneous exposure position shown in Fig. 1, pivotal movement of the trigger causes no movement of latching arm 130, edge portion 154a of arm 154 being adapted to slide freely upon edge surface 140a of arm 140. When the trigger is at full cocked position, as determined by contact thereof with limit stop 128, said edge portion 154a is brought to rest against surface portion 160a of arm 160. It follows that portion 154a still bears upon portion 160a when arm 140 is withdrawn to its limit for a "bulb exposure," said withdrawal causing clockwise rotation of arm 160. Assuming the last-named setting of elements and the trigger to be manually actuated in a counterclockwise direction, surface 154a is slidably removed from surface 160a, and arm 154 is caused to rotate in a counterclockwise direction, under bias of spring 158, the extremity thereof, 154b, passing beneath arm 160, the angle of rotation of said arm 154 being small owing to renewed contact of surfaces 154a and 140a. After removal of manually applied force from handle 116, the trigger is actuated by extension spring 122, said trigger being rotated in a clockwise direction and returned to a full cocked position. Coincidental with said last-named return rotation of the trigger, extremity 154b of arm 154 moves substantially upwardly, bears against surface 160b of arm 160, and rotates said arm 160 in a counterclockwise direction. Accordingly, said counterclockwise rotation of arm 160 pivots latching arm 130 similarly to instantaneous exposure position by drawing arm 140 to its maximum inward position. As hereinbefore described, when latching arm 130 is pivoted in a counterclockwise direction to instantaneous setting, torsional hairspring 136 returns the shutter to closed position. In résumé and in accordance with the aforesaid constructions and operation of elements, it will be seen that a "bulb exposure" is obtained by withdrawing knob 142 to the limit stop, and by manually actuating the trigger, the period of said exposure being determined by the time during which the trigger handle is manually depressed against stop 120. After release of the trigger handle, the impulse arm is automatically recocked, the shutter returns to closed position, and the mechanism is reset for an instantaneous exposure.

Figure 2:
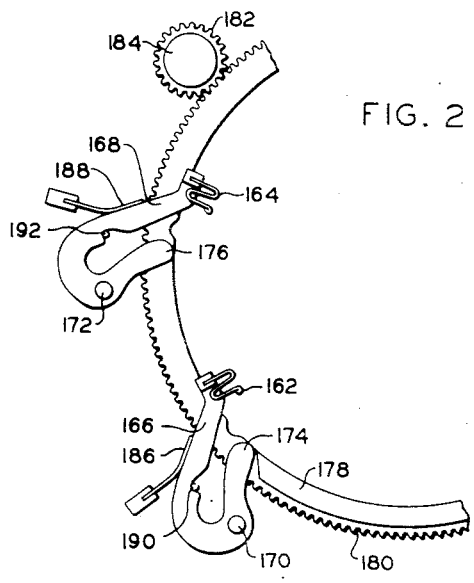
Fig. 2 is a fragmentary elevational view of a modification of shutter speed setting elements of Fig. 1.

In Fig. 2, alternate means for varying shutter speed are shown, said means comprising a plurality of rebound or shutter reversing springs, each of said springs being functionally similar to the single spring of Fig. 1 and enabling reversal of rotation of the shutter at a predetermined angle thereof. The rebound springs have suitable mounting and actuating means associated therewith enabling their selective positioning in the path of shutter rotation, each spring, when thus positioned, being capable of providing a predetermined shutter speed. The mechanism of Fig. 2 is adapted to incorporation with the shutter, shutter actuating mechanism, "bulb exposure," and instantaneous exposure elements of Fig. 1. Two such rebound springs 162 and 164 are illustrated, it being understood that additional rebound springs may be provided, said springs being spaced apart at predetermined intervals around the path of arcual movement of the shutter. The rebound springs are mounted upon individually positionable arms 166 and 168, said arms being adapted to provide movement of the rebound springs in and out of the path of shutter rotation. Arms 166 and 168 are rotatably mounted upon portions of the camera casing or frame (not shown) by pivots 170 and 172, respectively, said arms comprising cam followers 174 and 176. The cam followers are adapted to actuation by cam 178 which is carried by gear 180, said gear, in turn, being rotatable by pinion 182, having knob 184 affixed thereto. Arms 166 and 168 are biased inwardly by springs 186 and 188, limits of inward or clockwise rotation of said arms being established by stops 190 and 192, respectively. When cam 178 is rotated, for example, in a clockwise direction it will be seen that cam follower 174 is actuated, causing counterclockwise rotation of arm 166 and removal of rebound spring 162 from the path of shutter rotation, thus leaving rebound spring 164 in functional position. Suitable detent means, such as means shown in Fig. 1, are provided for positively designating and releasably holding each rebound spring at functional position. Further rotation of cam 178 removes rebound spring 164 from the shutter path, thus permitting additional rebound springs (not shown) to assume the function of shutter reversal. It is to be understood that springs 186 and 188 are of sufficient stiffness to hold arms 166 and 168 firmly against their respective stops when the shutter strikes the rebound springs.

Figure 3:
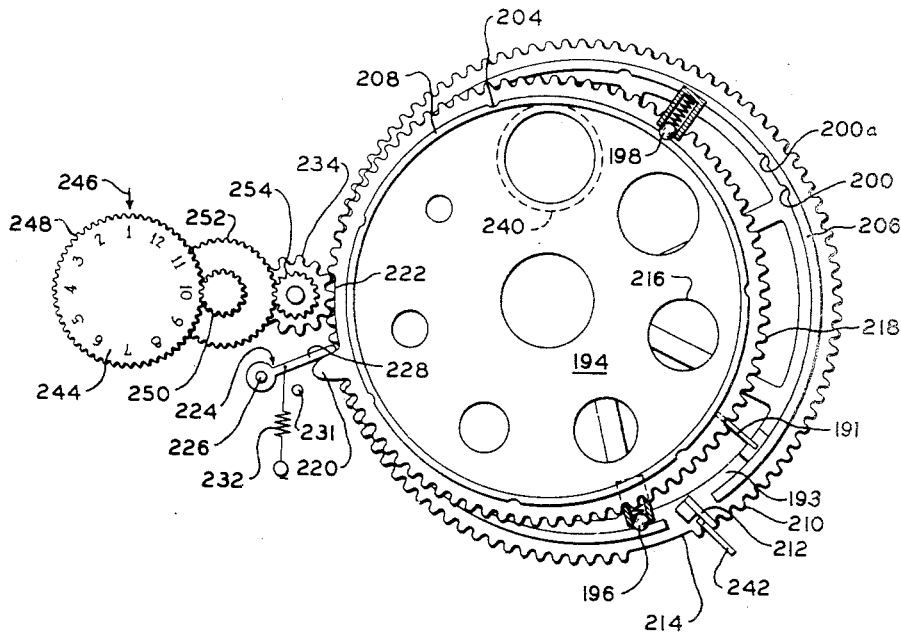
Fig. 3 is a somewhat schematic elevational view of a further modification of mechanism of Fig. 1 incorporating a single control for obtaining correlated settings of the shutter and diaphragm.
Figure 4:
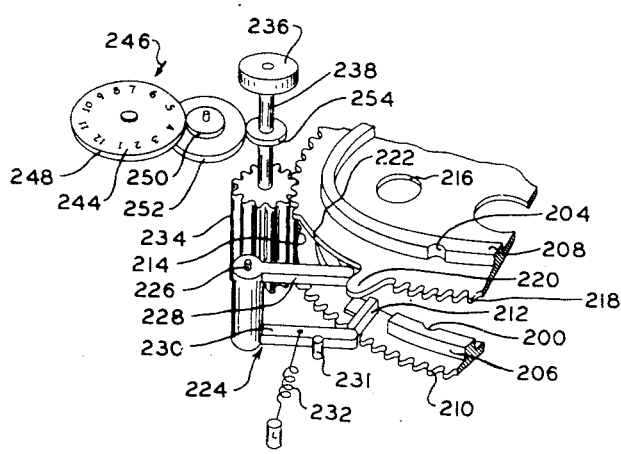
Fig. 4 is a fragmentary perspective view of elements of Fig. 3 illustrating operation thereof.

Figs. 3 and 4 comprising elevational and perspective views of one mechanism show shutter speed and diaphragm control elements which are somewhat similar in form to those represented in Fig. 1 insofar as said mechanism embodies a single rebound spring 191, a rebound spring carrier 193, a disc-type diaphragm 194, and detent means 196 and 198 mounted upon fixed bracket of frame portions (not shown) and adapted to engage recesses 200 and 204 formed in said carrier and diaphragm, respectively, as for example, in suitable annular flanges 206 and 208, for releasably holding the rebound spring and diaphragm at various angles of rotation thereof. The assembly, however, comprises modified means for achieving correlated settings of the rebound spring and diaphragm apertures, and, furthermore, comprises indicating means for establishing said settings. The rebound spring carrier and diaphragm are represented as nonconcentric, principally to enable a clear showing of the constructions, concentric mounting of said elements being readily possible, however, without affecting operation thereof. It is to be assumed that suitable bearing means, such as those shown in Fig. 1, are provided for rotational mounting of said elements in a camera.

Rebound spring carrier 193 comprises toothed peripheral portions forming gear 210, a lug 212 mounted to extend substantially radially upon said carrier, and toothless sector 214 interrupting continuity of gear 210. Diaphragm 194 comprises a plurality of apertures 216 of predeterminedly varying diameter formed therein, toothed peripheral portions forming gear 218, a lug 220 extending substantially radially from the periphery thereof, and toothless sector 222 interrupting continuity of gear 218. A yoke-like element 224, comprising bearing shaft 226 and arms 228 and 230 is pivotally mounted upon casing or frame portions (not shown), said yoke, in conjunction with the aforesaid lugs, serving as a medium for the transmittal of rotational force from the diaphragm gear 218 to the rebound spring gear 210 and vice versa. Said yoke is preferably gently biased in a clockwise direction against stop 231 by spring 232. A pinion 234 is adapted to engage gears 210 and 218, said pinion having a control knob 236 rigidly connected thereto by a shaft 238, said shaft passing through a suitable bearing in the camera casing (not shown). The constructions and mutual operation of aforesaid gears 210 and 218, lugs 212 and 220, toothless sectors 214 and 222, yoke 224, and pinion 234 are such that when one of said toothless sectors has been rotated to a position adjacent pinion 234 the element of which it forms a part derives no rotational force and remains stationary while the element comprising the other toothless sector is adapted to rotation, through engagement of its toothed peripheral portions with said pinion 234. As shown in Fig. 3, toothless sector 222 of the diaphragm is adjacent pinion 234 and, accordingly, the diaphragm remains stationary, the largest aperture thereof being adjacent the exposure aperture 240. However, peripheral gear 210 of the rebound spring carrier is in engagement with said pinion 234, enabling variation of position of the rebound spring and hence variation of shutter speed. In Fig. 3, it is also to be noted that rebound spring 191 is at maximum clockwise position, providing slowest shutter speed, said position being established by contact of lug 212 with limit stop 242.

Fig. 4 illustrates clockwise rotation of pinion 234 and the transfer of counterclockwise rotational force from the rebound spring carrier to the diaphragm through the media of the aforesaid lugs and yoke. Toothless sector 214 has been rotated adjacent pinion 234. Lug 212 has actuated yoke arm 230 in a clockwise direction, causing similar rotation of yoke arm 226. Arm 226 has actuated lug 220 in a counterclockwise direction removing toothless sector 222 from adjacency with pinion 234 and causing engagement of gear 218 with said pinion. During transfer of rotational force, gears 210 and 218 will both be caused to rotate for a brief period. During said simultaneous rotation the largest aperture is either brought to the exposure position or removed therefrom depending upon the direction of rotation of the aforesaid elements. With any aperture other than the largest at operating position, recess 200 is engaged with detent 196, giving maximum possible shutter speed. During simultaneous rotation of diaphragm 194 and carrier 193, recess 200a is moved into engagement with detent 196. The maximum shutter speed obtainable with the largest aperture in position is thus slightly less than the maximum speed for other apertures.

Indicating means of Figs. 3 and 4 comprises rotatable dial 244 and fixed index 246, said dial carrying a plurality of numbers, arranged as shown, said numbers representing light values. Said light values may preferably correspond to light value numbers carried on the scale of a light meter, thus permitting a setting of the indicating means directly, according to the prevailing value indicated on the light meter, without the necessity of first computing a correct setting. Rotation of dial 244 to bring a given number thereof adjacent index 246 sets up a correlated shutter speed and diaphragm aperture providing a predetermined exposure value, said rotation of the dial being accomplished by a gear train connecting said dial with pinion 234 and comprising gears 248, 250, 252, and 254. It is to be understood that said gears and gears 210 and 218 are of suitable relative diameter and that gears 248, 210, and 218 are engaged at suitable angles of rotation for insuring dial settings which are accompanied by accurate exposure value settings of the mechanism. Assuming the lowest number to indicate an extremely low light value, a prevailing light value of very low intensity is indicated in the dial setting of Fig. 3, showing number 1 at the fixed index, the largest diaphragm aperture thus being positioned at the exposure aperture and the rebound spring being at a position for effecting slowest shutter speed. Subsequent rotation of dial 244 in a clockwise direction to bring numbers 2 through 6 to the fixed index provides progressive increases in shutter speed. Continued rotation of the dial provides positioning of diaphragm apertures of diminishing diameter at the exposure aperture, one complete rotation of the dial accompanying the entire range of possible rebound spring and aperture settings. The dial setting of Fig. 4 indicates a transitional phase of exposure value settings whereat the rebound spring is positioned for maximum shutter speed and the next to largest diaphragm aperture is approaching the exposure aperture.

Figure 5:
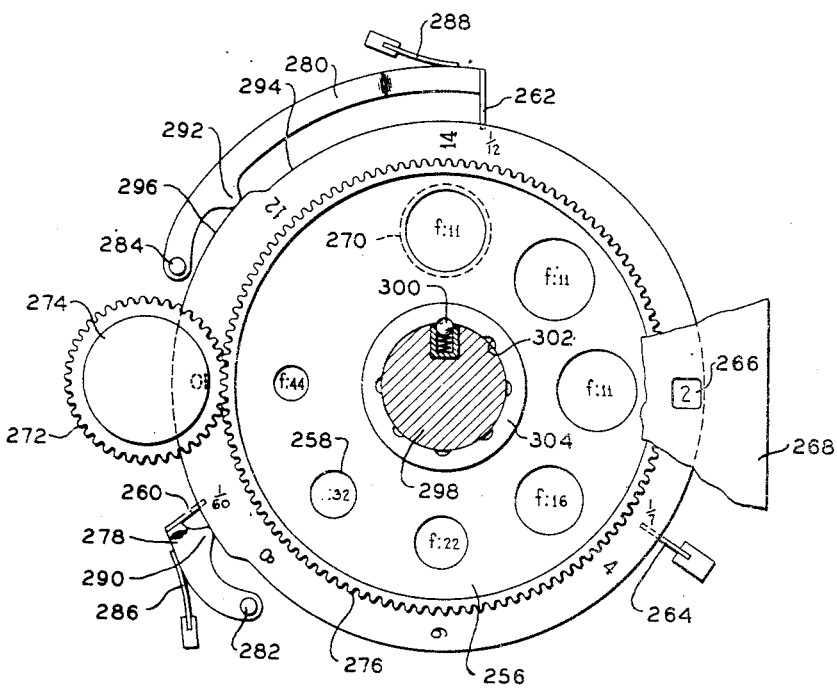
Fig. 5 is a schematic elevational view of a preferred modification of mechanism incorporating a single control for obtaining correlated settings of the shutter and diaphragm.

Fig. 5 schematically represents a further modification of apparatus comprising rotatable, disc-type diaphragm 256 having apertures 258 of various diameter formed therein, rebound springs 260, 262 and 264 for providing various shutter speeds, indicating means comprising numbers 2 to 14 inclusive, carried on a surface of the diaphragm, an aperture 266 in casing portion 268 through which said numbers may be individually observed. Said modification exemplifies a simplified and preferred design for setting shutter speed at a selected predetermined value and for bringing diaphragm apertures to exposure position in full-stop steps, as, for example, f:44, f:32, f:22, f:16, and f:11 at 1/60 of a second, and for setting an aperture of predetermined diameter at the exposure aperture 270 and altering shutter speed as, for example, f:11 at 1/12 and 1/7 of a second. The aforesaid numbers represent light values as hereinbefore described, and aperture 266 serves as a fixed index for positioning said numbers, any number visible therethrough being indicative both of that aperture which is positioned adjacent exposure aperture 270 and of operational positioning of one of the aforesaid rebound springs. It is to be understood that elements of Fig. 5 are viewed from a position similar to that assumed in Fig. 1 and that a shutter of the general type shown in Fig. 1 is to be associated therewith, said shutter thus rotating in a clockwise direction, meeting one of the rebound springs, and returning to original position. Any combination of settings of the aforesaid mechanism, obtained by bringing a selected number to aperture 266, provides a correct exposure value.

A pinion 272 and control knob 274, unitary therewith and positionable exteriorly of a camera casing, provide means for rotating diaphragm 256, said pinion engaging gear portion 276 of the diaphragm for actuating said gear. Rebound springs 260 and 262 are mounted, respectively, upon rotatable arms 278 and 280, said arms rotating about respective pivots 282 and 284 and being biased for clockwise rotation by springs 286 and 288. The aforesaid elements are mounted upon suitable frame or casing portions (not shown). Each of said arms also comprises, respectively, a cam follower 290 and 292, said followers being adapted to ride on the periphery of the diaphragm and said periphery being in the form of a cam. Said cam comprises two sectors 294 and 296, sector 296 having a greater radius than sector 294. When the diaphragm is rotated and followers 290 and/or 292 ride upon sector 296, rebound springs associated therewith are rotated substantially radially away from the arcual path of the shutter to nonoperational position, and when said followers ride upon sector 294, they are functionally positioned for intercepting said shutter during rotation thereof. Again considering initial clockwise rotation of the shutter, as shown in Fig. 1, it will be seen from Fig. 5 that rebound spring 264 is the last of said springs for intercepting the shutter and, because said spring 264 provides the slowest shutter speed, it may be fixedly mounted, as shown. Suitable detent means are provided for releasably holding the diaphragm at various rotational positions identified with the positioning of each of the several apertures adjacent lens aperture 270. Said means comprises, for example, fixed axle 298, detent means 300 suitably mounted therewithin, and a plurality of recesses 302 formed in diaphragm hub 304 and adapted to engage said detent.

Although it will be understood that the number of rebound springs shown is not arbitrary and that rebound springs having suitable positioning means therefor may be deleted or added according to the number of shutter speeds to be included, the length of cam sector 296 and positioning of respective followers must be carefully predetermined for moving rebound springs in and out of position. At the setting of mechanism shown in Fig. 5, cam sector 296 has raised cam followers 290 and 292, causing rotation of rebound springs 260 and 262 to idle position, fixed rebound spring 264 being operative for providing a shutter speed of $1/7$ of a second. Counterclockwise rotation of the diaphragm from said setting progressively causes the cam followers to leave sector 296 and bear upon sector 294, in turn, bringing rebound springs 262 and 260 into functional position, thus providing respective shutter speeds of $\frac{1}{2}$ and $1/60$ of a second. For obtaining a shutter speed of $1/60$ of a second when aperture f:11 is positioned adjacent lens aperture 270 it will be obvious that cam sector 296 should not actuate cam follower 290, said condition being rendered possible by a sufficiently limited length of said cam sector 296. A suitable length of cam sector 296 is insured by forming arm 280, between cam follower and rebound spring mounting portions thereof, of a sufficient length for the purpose. Springs 286 and 288, respectively, provide means for holding cam followers 290 and 292 in contact with cam sector 294 whereby impact of the shutter against rebound spring 260 or 262 causes no radial displacement of said rebound springs. It will be understood that the diaphragm may be rotated in either clockwise or counterclockwise direction for obtaining any of the aforesaid settings with utmost rapidity and that detent 300 engaging recesses 302 operates to hold the diaphragm stationary when numerical indicia are positioned adjacent the fixed index. It is further to be understood that f: and time values shown in Fig. 5 are illustrative and not to be considered as arbitrary values.

Mechanisms schematically shown in the drawings include a plurality of elements which are generally suitable in form for performing various above-described functions. However, it will be evident that certain of said elements may readily be altered in form, or interchanged to form further modifications, and that numerous alternative elements could be employed, within the scope of the invention, to perform similar functions. The embodiment, in Fig. 5, of three apertures of similar diameter for maintaining constant aperture diameter while varying shutter speed, could, for example, be modified to show a single slot-like aperture encompassing said three apertures and the areas therebetween. Instead of the plurality of rebound springs shown in Fig. 5, a single rebound spring could be mounted upon a suitable portion of member 256, said spring being rotatable to various angular positions as shown in Fig. 1. A further modification of Fig. 5 would comprise an elongated form of rebound spring, said spring tending to spring inwardly into the path of shutter rotation and having portions suitably formed for direct actuation in and out of said path by the cam. It will also be apparent that diaphragm apertures of Fig. 5 could all be of different diameter. Rebound springs of various form may be employed as, for example, one or more rebound springs having incorporated or associated therewith means for varying their deflection characteristics and thus varying shutter speed. Means for altering operational length of a flat-type spring would fall within this category. If preferred, the rebound spring could be incorporated with the shutter per se, in which instance rigid lug members, positionable within the path of shutter rotation, would serve as reversing means. It will likewise be apparent that means may be provided for varying tension of extension spring 92 of Fig. 1 whereby rotational speed of impulse arm 90 and, accordingly, of the shutter may be varied, said means, for example, being adapted to adjustments of shutter speed during assembly or having a control associated therewith for obtaining operational adjustments of shutter speed.

Where shown, as an element for providing the slowest shutter speed, the rebound spring may be supplanted by alternative means for reversing direction of shutter rotation, said means comprising either hairspring 136 or a hairspring having different torsional characteristics therefrom. Furthermore, a hairspring having means associated therewith for varying torsional characteristics thereof could be employed to provide a plurality of relatively slow shutter speeds. As shown in Fig. 1, hairspring 136 primarily performs the function of returning the shutter to closed position after a time exposure, and, secondarily, that of biasing the shutter toward said position should actuating means for an instantaneous exposure fail to accomplish said movement. It will be apparent that another form of means for effecting return of the shutter to closed position after a "bulb exposure" may, for example, comprise a shutter actuating element associated with the "bulb exposure" latching means per se. The hairspring may thus be eliminated from the mechanism under certain of the above conditions, although its inclusion is preferred. The shutter element may be modified in form as, for example, by eliminating the counterbalance portion thereof, said modification reducing the mass of the shutter and permitting a lighter construction of spring and other associated elements or enabling greater rotational speed of the shutter.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means for varying the extent of rotational movement of said shutter and thereby varying exposure time, and common means for rotating said diaphragm to alter the position of said diaphragm apertures and for actuating said means varying exposure time.

2. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means for varying the extent of rotational movement of said shutter and thereby varying exposure time, common means for rotating said diaphragm to alter the position of said diaphragm apertures and for actuating said means varying exposure time, and means releasably holding said diaphragm apertures and said means varying exposure time at any of a plurality of correlated settings providing predetermined exposure values.

3. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means for varying the extent of rotational movement of said shutter and thereby varying exposure time, common means for rotating said diaphragm to alter the position of said diaphragm apertures and for actuating said means varying exposure time, and single means for visibly indicating the aforesaid correlated settings of said diaphragm apertures and said means varying exposure time.

4. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means for varying the extent of rotational movement of said shutter and thereby varying exposure time, common means for rotating said diaphragm to alter the position of said diaphragm apertures and for actuating said means varying exposure time, and common means releasably holding said diaphragm apertures and said means varying exposure time at any of a plurality of correlated settings providing predetermined exposure values.

5. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, variably positionable means for altering the extent of rotational movement of said shutter and thereby varying exposure time, common means for rotating said diaphragm to alter the position of said diaphragm apertures and for providing variation in the position of said means varying exposure time, means releasably holding said diaphragm apertures and said means varying exposure time at any of a plurality of correlated settings providing predetermined exposure values, and single means for visibly indicating the aforesaid correlated settings of said diaphragm apertures and said means varying exposure time.

6. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means disconnectable from said shutter for initiating rotation thereof, said shutter being adapted to continued rotation after removal of said means for initiating rotation from contact therewith, variably positionable means for altering the extent of rotational movement of said shutter and thereby varying exposure time, common means for rotating said diaphragm to alter the position of said diaphragm apertures and for providing variation in the position of said means varying exposure time, means releasably holding said diaphragm apertures and said means varying exposure time at any of a plurality of correlated settings providing predetermined exposure values, and single means for visibly indicating the aforesaid correlated settings of said diaphragm apertures and said means varying exposure time.

7. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means for varying the extent of rotational movement of said shutter and thereby varying exposure time, means comprising a portion of said diaphragm, simultaneously rotatable therewith, for actuating said last-named means for varying exposure time, single control means for rotating said diaphragm to alter the position of said diaphragm apertures and actuate said means for varying exposure time, and means releasably holding said diaphragm at predetermined angles of rotation, said angles providing correlated operational settings of said diaphragm apertures and said means for varying exposure time, said settings providing predetermined exposure values.

8. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means for varying the extent of rotational movement of said shutter and thereby varying exposure time, common means for rotating said diaphragm to alter the position of said diaphragm apertures and for actuating said means varying exposure time, and single means for visibly indicating the aforesaid correlated settings of said diaphragm apertures and said means varying exposure time, said indicating means comprising indicia representing predetermined light values carried by the diaphragm, said indicia being visibly positionable with respect to a fixed index.

9. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means comprising a resilient element variably positionable in the path of rotation of the shutter for reversing the direction of rotation of said shutter, thereby altering the extent of rotational movement of said shutter and varying exposure time, and common means for rotating said diaphragm to alter the position of said diaphragm apertures and for actuating said means varying exposure time.

10. In a camera, apparatus for providing a photographic exposure comprising, in combination, a rotatable disc-like diaphragm comprising a plurality of apertures of different diameter placed therein for rotation to and from operative relation with the exposure aperture of said camera, a rotary shutter element providing a closure for said exposure aperture when at a stationary position and providing an open aperture during displacement from said stationary position, means for imparting rotation to said shutter, means comprising a spring-like element and a cam follower associated therewith, said spring-like element being variably positionable in the path of rotation of the shutter for reversing the direction of rotation of said shutter, thereby altering the extent of rotational movement of said shutter and varying exposure time, means comprising a cam portion of said diaphragm, simultaneously rotatable therewith, for actuating said cam follower, single control means for rotating said diaphragm to alter the rotational position of said diaphragm apertures and cam, thus actuating said cam follower and spring-like element and varying exposure time, and means for positioning said diaphragm at predetermined angles of rotation, said angles providing correlated operational settings of said diaphragm apertures and said means for varying exposure time, said settings providing predetermined exposure values.

11. Shutter mechanism for association with the exposure aperture of a camera, said mechanism comprising, in combination, a shutter element providing a closure for said aperture when at a stationary position and providing an open aperture during displacement from said stationary position, means cooperating with said shutter element to control the movement thereof, said last-named control means being capable of being set to a plurality of different positions, in one position thereof providing for one exposure speed and in a second position thereof providing for a different exposure speed, means for controlling the effective exposure area of said exposure aperture, said means being capable of being set to a plurality of positions and in one position providing an effective exposure aperture of one area and in another exposure position providing for an effective exposure aperture in a different area, and common means for controlling the settings of said aforementioned exposure speed and exposure opening control means so that each of said two aforementioned shutter speeds may be used in conjunction with at least one of said effective exposure apertures by operation of said common means.

MURRY N. FAIRBANK.

No references cited.

Certificate of Correction

April 18, 1950

Patent No. 2,504,312

MURRY N. FAIRBANK

It is hereby certified that errors appear in the printed specification of the above numbered patent requiring correction as follows:

Column 4, line 39, after "shutter" insert a comma; column 6, line 32, for "liimt" read *limit*; column 10, line 13, for "of frame" read *or frame*; column 12, line 3, after the word and comma "diaphragm," insert *and*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*